United States Patent
Pham et al.

(10) Patent No.: US 11,146,548 B2
(45) Date of Patent: *Oct. 12, 2021

(54) TECHNIQUES FOR PEER ENTITY ACCOUNT MANAGEMENT

(71) Applicant: Capital One Services, LLC, McLean, VA (US)

(72) Inventors: Vincent Pham, Champaign, IL (US); Reza Farivar, Champaign, IL (US); Jeremy Edward Goodsitt, Champaign, IL (US); Fardin Abdi Taghi Abad, Champaign, IL (US); Anh Truong, Champaign, IL (US); Kate Key, Effingham, IL (US); Austin Grant Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/589,525

(22) Filed: Oct. 1, 2019

(65) Prior Publication Data

US 2020/0228522 A1  Jul. 16, 2020

Related U.S. Application Data

(63) Continuation of application No. 16/244,569, filed on Jan. 10, 2019, now Pat. No. 10,440,015.

(51) Int. Cl.
| | |
|---|---|
| *H04L 29/00* | (2006.01) |
| *H04L 29/06* | (2006.01) |
| *G06Q 40/02* | (2012.01) |

(52) U.S. Cl.
CPC ........ *H04L 63/0853* (2013.01); *G06Q 40/02* (2013.01); *H04L 63/0892* (2013.01)

(58) Field of Classification Search
CPC .. H04L 63/0853; H04L 63/0892; G06Q 40/02
See application file for complete search history.

(56) References Cited

U.S. PATENT DOCUMENTS

| | | | | |
|---|---|---|---|---|
| 8,302,187 | B1 * | 10/2012 | Gupta | H04L 65/1079 726/22 |
| 8,555,357 | B1 * | 10/2013 | Gauvin | H04L 63/1441 726/6 |
| 8,788,389 | B1 * | 7/2014 | Fernandes | G06Q 20/382 705/35 |
| 9,264,418 | B1 * | 2/2016 | Crosley | H04L 51/12 |
| 9,665,907 | B2 * | 5/2017 | Hamilton, II | G06Q 20/04 |

(Continued)

*Primary Examiner* — Don G Zhao
(74) *Attorney, Agent, or Firm* — Kacvinsky Daisak Bluni PLLC

(57) ABSTRACT

Techniques and apparatus for providing peer-based management of user accounts are described. In one embodiment, for example, an apparatus may include at least one memory and logic coupled to the at least one memory. The logic may be configured to receive a request from at least one first user account to unlock a second user account locked responsive to a fraud event, determine a safe authentication value for the fraud event, and unlock the second user account responsive to the at least one first user account being a safe authentication account and the safe authentication value being over a safe authentication threshold value. Other embodiments are described.

20 Claims, 13 Drawing Sheets

(56) References Cited

U.S. PATENT DOCUMENTS

| | | | | |
|---|---|---|---|---|
| 9,760,871 B1* | 9/2017 | Pourfallah | G06Q 20/3276 |
| 10,489,781 B1* | 11/2019 | Osborn | G06Q 20/3829 |
| 2005/0171898 A1* | 8/2005 | Bishop | G06Q 20/00 | 705/39 |
| 2006/0226216 A1* | 10/2006 | Keithley | G06Q 20/4016 | 235/379 |
| 2006/0237528 A1* | 10/2006 | Bishop | G06Q 20/385 | 235/380 |
| 2008/0031447 A1* | 2/2008 | Geshwind | H04L 9/3226 | 380/46 |
| 2008/0071674 A1* | 3/2008 | Thackston | G06Q 40/025 | 705/38 |
| 2008/0113776 A1* | 5/2008 | Sommer | G07F 17/3248 | 463/25 |
| 2010/0078471 A1* | 4/2010 | Lin | G06Q 40/02 | 235/379 |
| 2010/0250410 A1* | 9/2010 | Song | G06Q 30/0248 | 705/30 |
| 2011/0225045 A1* | 9/2011 | Song | G06Q 20/38 | 705/14.53 |
| 2012/0191596 A1* | 7/2012 | Kremen | G06Q 40/02 | 705/38 |
| 2012/0330819 A1* | 12/2012 | Weinflash | G06Q 40/02 | 705/38 |
| 2013/0275300 A1* | 10/2013 | Killian | G06Q 20/349 | 705/41 |
| 2013/0304910 A1* | 11/2013 | Hanlon | H04L 67/26 | 709/224 |
| 2014/0006970 A1* | 1/2014 | Casey | H04L 51/32 | 715/753 |
| 2014/0304828 A1* | 10/2014 | Hollier | G06Q 20/102 | 726/26 |
| 2015/0178493 A1* | 6/2015 | Liu | H04L 63/0884 | 726/6 |
| 2016/0027248 A1* | 1/2016 | Barclay | G07F 17/3234 | 463/25 |
| 2016/0086263 A1* | 3/2016 | Weinflash | G06Q 40/025 | 705/38 |
| 2016/0098791 A1* | 4/2016 | Huang | G06Q 20/3552 | 705/35 |
| 2016/0104238 A1* | 4/2016 | Loganathan | G06Q 40/02 | 705/35 |
| 2016/0203307 A1* | 7/2016 | Kyowski | G06F 21/36 | 726/19 |
| 2016/0277439 A1* | 9/2016 | Rotter | H04W 12/06 |
| 2016/0316369 A1* | 10/2016 | Jiang | H04W 12/08 |
| 2016/0358180 A1* | 12/2016 | Van Os | G06Q 20/34 |
| 2017/0032343 A1* | 2/2017 | Kurniadi | H04L 67/22 |
| 2017/0061430 A1* | 3/2017 | Matthews | G06Q 30/0215 |
| 2017/0237744 A1* | 8/2017 | Chae | G06F 3/0488 | 726/7 |
| 2017/0272461 A1* | 9/2017 | Wang | H04L 63/083 |
| 2017/0346797 A1* | 11/2017 | Yedidi | H04L 63/14 |
| 2018/0007079 A1* | 1/2018 | Wang | H04L 63/0421 |
| 2018/0041479 A1* | 2/2018 | Wang | H04W 12/06 |
| 2018/0046796 A1* | 2/2018 | Wright | G06F 21/45 |
| 2018/0336543 A1* | 11/2018 | Van Os | G06Q 20/223 |
| 2018/0374058 A1* | 12/2018 | Perrone | G06Q 30/0219 |
| 2019/0034923 A1* | 1/2019 | Greco | G06Q 20/389 |
| 2019/0057400 A1* | 2/2019 | Nair | G06Q 20/20 |
| 2020/0118089 A1* | 4/2020 | Bartrim | G06Q 20/385 |
| 2020/0118090 A1* | 4/2020 | Bartrim | G06Q 20/0855 |
| 2020/0118091 A1* | 4/2020 | Bartrim | G06Q 20/367 |
| 2020/0118106 A1* | 4/2020 | Bartrim | G06Q 20/367 |
| 2020/0184048 A1* | 6/2020 | Toth | G06F 21/6218 |
| 2020/0184065 A1* | 6/2020 | Toth | G06F 21/45 |
| 2020/0213298 A1* | 7/2020 | Ericson | H04W 12/00407 |
| 2020/0213310 A1* | 7/2020 | Ju | G06Q 20/3821 |

\* cited by examiner

TECHNIQUES FOR PEER ENTITY ACCOUNT MANAGEMENT

RELATED APPLICATIONS

This application is a continuation of U.S. patent application Ser. No. 16/244,569, entitled "TECHNIQUES FOR PEER ENTITY ACCOUNT MANAGEMENT" filed on Jan. 10, 2019. The contents of the aforementioned application are incorporated herein by reference.

TECHNICAL FIELD

Embodiments herein generally relate to managing security of a user account and/or transactions associated with the user account and, more particularly, to processes for peer-based management of user accounts and/or transactions.

BACKGROUND

Service providers provide a safe operating platform via managing security for user accounts and transactions. For example, a user account may be locked or frozen in response to certain criteria, such as an insecure event or prolonged absence from the service provider platform. In conventional platforms, the user is required to contact the service provider, for example, via customer service or an online interface, in order to unlock their user account. Such solutions are inefficient (for instance, the time and effort required to unlock a user account via customer service) and/or prone to fraudulent activity (for instance, email and/or text message based solutions are prone to fraudulent activity, particularly for compromised or lost computing devices).

DETAILED DESCRIPTION

Figure 1:
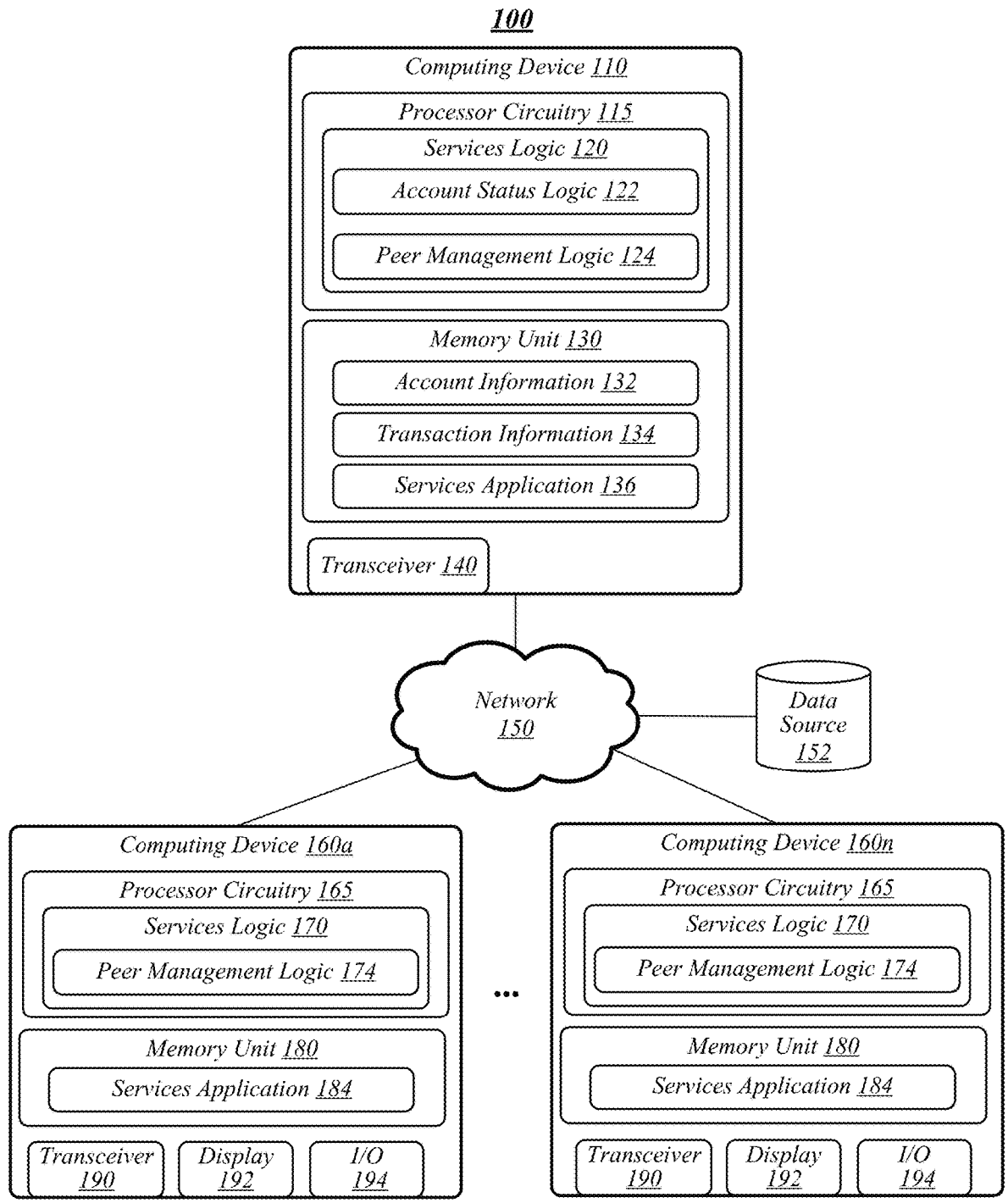
FIG. 1 illustrates an embodiment of a first operating environment.

Various embodiments may generally be directed toward systems, methods, and/or apparatus for peer entity management of user accounts. The user accounts may be associated with a user, customer, client, and/or the like of a service provider. In some embodiments, a user account of a service may be designated as a peer management account based on, for example, at least one peer management criteria. A peer management account may be allowed by the service provider to manage various aspects of other user accounts. Accordingly, embodiments may provide peer-based user account management in which a user account and/or associated articles may be managed by a peer entity (for instance, a first customer user account may be managed by a second customer (or peer)).

For example, a first user account may be associated with a first customer of a financial service, such as an online management platform of a credit card issued by a service provider. The credit card may be locked or frozen by the service provider due to an event, such as a potential fraud event. In a conventional system, the first customer may be required to contact the service provider, for example, by calling customer service to attempt to unlock the credit card. Such methods are inefficient and inconvenient as they require time and effort for the customer to interact with customer service to unlock the credit card. In other conventional systems, a user may interact with an online platform of the service provider via a user computing device (for instance, a smart phone) and attempt to unlock the user account via an email or short message service (SMS) (or text) message with a code or yes/no reply. However, such methods are prone to misuse and fraud, particularly if the user account or user computing device has been compromised or stolen.

In some embodiments, the first customer may attempt to unlock the credit card via a peer customer of the financial service provider. For example, a second customer of the financial service provider may be associated with a second user account designated as a peer management or "safe authentication" account. The first customer may log into the first user account, for instance, via an application on a computing device of the first customer. The first customer may request a peer entity management process in which another customer ("peer" or "peer entity") may perform a process to unlock the credit card of the first customer. The peer entity unlock process may be granted by the financial service provider based on various peer management criteria associated with the transaction, credit card, user account, and/or the like. The second customer (for instance, the "peer" or "peer entity") may log into the second user account and submit a request for a peer entity management process relating to the first customer. In some embodiments, the request may include identifying information relating to the first customer, such as an email address, user name, and/or the like. The financial service provider may unlock the credit card of the first customer responsive to approving the request for the peer entity management process from the second customer.

In some embodiments, peer management processes may allow for a peer account to manage at least one element of another user account. In some embodiments, a peer management process for unlocking an account, such as a financial services account, may be referred to as a "safe authentication" process. In various embodiments, management may include modifying a characteristic or status of a user account. In some embodiments, the user account may be affected in a certain manner to be designated as an affected user account. For example, the affected user account may be locked or may have an aspect thereof (for instance, a function) locked or frozen. In various embodiments, management may include unlocking a user account, verifying a user account, transferring funds to/from a user account, performing transactions via the user account, and/or the like. Embodiments are not limited in this context.

Accordingly, some embodiments may provide multiple technological advantages over prior art systems. In addition, various embodiments may provide improvements in computing technology, for instance, by providing peer entity management processes for user accounts and/or related articles associated with a service provider. A non-limiting example of a technological advantage and/or improvement in computing technology may include improvements in the security and/or efficiency of computing systems managing user accounts, services, and/or related articles. Another non-limiting example of a technological advantage and/or improvement in computing technology may include improvements in a user experience with an account-based service, including an improved user experience relating to unlocking a locked account element. Another non-limiting example of a technological advantage and/or improvement in computing technology for a service provider may include the ability to provide more efficient service, for example, that avoids the need for an account holder to directly contact an employee or customer service system of the service provider for certain types of assistance described herein.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include computing device 110 communicatively coupled to computing devices 160a-n, for example, via network 150. In some embodiments, computing device 110 and/or computing devices 160a-n may be or may include a stand-alone computing device, such as a personal computer (PC), server, tablet computing device, cloud computing device, mobile computing device (for instance, a smart phone, tablet computing device, and/or the like), data appliance, and/or the like. In some embodiments, computing device 110 may include a plurality of computing devices and/or computing systems (for instance, data centers, cloud computing environments, computing clusters, and/or the like). In various embodiments, computing device 110 may be associated with a service provider to provide services to customers. In exemplary embodiments, computing devices 160a-n may be customer computing devices (for instance, smart phones, tablet computing devices, laptops, and/or the like) for accessing services provided via computing device 110.

Although only one computing device 110 is depicted in FIG. 1, embodiments are not so limited. In various embodiments, the functions, operations, configurations, data storage functions, applications, logic, and/or the like described with respect to computing device 110 may be performed by and/or stored in one or more other computing devices. A single computing device 110 is depicted for illustrative purposes only to simplify the figure.

As shown in FIG. 1, computing device 110 may include processor circuitry 115, a memory unit 130, and a transceiver 140. Processor circuitry 115 may be communicatively coupled to memory unit 130 and/or transceiver 140.

Processor circuitry 115 may include and/or may access various logic for performing processes according to some embodiments. For instance, processor circuitry 115 may include and/or may access services logic 120, account status logic 122, and/or peer management logic 124. Processing circuitry 115 and/or services logic 120, account status logic 122, and/or peer management logic 124, and/or portions thereof, may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chipsets, software components, programs, applications, firmware, software modules, computer code, combinations of any of the foregoing, and/or the like.

Although services logic 120 is depicted in FIG. 1 as being within processor circuitry 115, embodiments are not so limited. In addition, although account status logic 122, authentication logic 124, and peer management logic 124 are depicted as being a logic of services logic 120, embodiments are not so limited, as account status logic 122, peer management logic 124, and/or system controller logic may be separate logics and/or may not be standalone logics but, rather, a part of services logic 120. For example, services logic 120, and/or any component thereof, may be located within an accelerator, a processor core, an interface, an individual processor die, implemented entirely as a software application (for instance, services application 136) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store a services application 136 that may operate, alone or in combination with services logic 120, to perform various functions according to some embodiments. For example, services application 136 may be or may include an application operative to implement functionality of services logic 120, account status logic 122, and/or peer management logic 124. In various embodiments, services logic 120 may operate to provide various services of a service provider associated with computing device 110. Non-limiting examples of service providers may include financial service providers (for instance, banking services, credit card services, financial advice services, brokerage services, and/or the like), entertainment service providers (for instance, entertainment services (for example, Netflix®, Amazon Prime® Video, Comcast®, Verizon®, and/or the like), gaming services, gambling/betting services, music streaming services, and/or the like), cloud computing or hosting service providers (for example, Amazon Web Services®), internet service providers, utility service providers, medical or healthcare service providers, education service providers, vehicle services (for instance, vehicle subscription services), and/or the like. Embodiments are not limited in this context.

In various embodiments, services logic 120 may operate to provide services associated with a service provider. For example, for a credit card services provider, services logic 120 may be operative to process credit card transactions and/or provide an application for users to access credit card accounts and associated functions. In another example, for an education services provider, services logic 120 may be operative to provide access to education resources, such as digital libraries, course videos, and/or the like. Embodiments are not limited in this context.

In various embodiments, services logic 120 may operate to provide user accounts for users of services provided by the service provider. For example, service provider may provide credit card services and services logic 120 may implement an enterprise platform for credit card users to set up user accounts to manage various aspects of their credit card, such as viewing account information, submitting payments, viewing transaction history, and/or the like. In some embodiments, the enterprise platform may be or may include a web-based platform that may be accessed remotely by users (for instance, via services application 184 of computing devices 160a-n). In another example, service provider may be a healthcare provider and the enterprise platform implemented via services logic 120 may provide patient access to their healthcare information, schedule medical appointments, and/or the like. Embodiments are not limited in this context.

In some embodiments, services logic 120 may create user accounts and store information associated with the user accounts as account information 132. In various embodiments, services logic 120 may manage user account authentication (for instance, login services, data encryption/decryption, and/or the like) for user accounts. Although FIG. 1 depicts information, such as account information 132 and/or transaction information 134, stored within computing device in memory unit 130, embodiments are not so limited. For example, information may be stored in data stores, databases, and/or the like outside of computing device 110, such as data source 152.

Account status logic 122 may operate to determine, provide, or otherwise manage the status of user accounts. In some embodiments, a user account may have various statuses, such as active, inactive, locked (or frozen), suspended, and/or the like. In exemplary embodiments, a user account may be associated with various transactions. For example, for a credit card user account, transactions may include purchase transactions, balance transfer transactions, cash advance transactions, and/or the like. In another example, for an entertainment user account, transactions may include content purchase transactions, content rental transactions, user access on additional devices, and/or the like. In various embodiments, each type of transaction may have a status associated with the user account. For example, a credit card user account may have an account status of active and may have certain transaction statuses indicating transactions that are active (for instance, unfrozen or unlocked) and other transactions that are inactive or locked. For example, a credit card user account may have transactions within a certain geographic area having a status of active (or unlocked) and transactions outside of the certain geographic area inactive (or locked). Account status logic 122 may use account information 132 (for instance, information associated with a user account) and/or transaction information 134 (for instance, information associated with a transaction) to determine user account and/or transaction statuses.

In various embodiments, account status logic 122 may set the account status of a user account based on status factors determined by the service provider (the account status may include individual transaction statuses for the user account). For example, a user account for a healthcare service provider may be locked due to lack of health insurance information. In another example, a user account for a financial services provider may be locked due to potentially fraudulent activity. Embodiments are not limited in this context.

In exemplary embodiments, account status logic 122 may be operative to determine account status based on user activity. For example, account status logic 122 may access or implement a fraud detection process, model, and/or the like to determine whether certain user activity indicates potential fraudulent activity. In various embodiments, account status logic 122 may determine a fraudulent transaction score based on various factors indicating the probability that a transaction is fraudulent or otherwise problematic. For example, for a credit card service provider, the fraudulent transaction factors may include, without limitation, transaction location, transaction frequency (for instance, a unusual number of transactions within a certain time frame), transaction amount, transaction type (for instance, the type of goods or services associated with the transaction), merchant information (for instance, a merchant associated with previous fraudulent activity), other indicators of unusual transactions (for instance, based on user history and/or activity typical of fraudulent transactions), and/or the like. Account status logic 122 may change the account status of a user account based on the fraudulent transaction score. For example, account status logic 122 may lock a credit card account responsive to a fraudulent transaction score that is over (or otherwise outside of) a fraud threshold value.

Peer management logic 124 may operate to provide peer management processes according to some embodiments. In various embodiments, peer management processes may allow a user account (for instance, a first customer user account) to be managed by a peer user account (for instance, a second user account). For example, a first customer user account (for instance, associated with computing device 160*a*) may be unlocked via a second customer user account (for instance, associated with computing device 160*b*).

In some embodiments, a peer or peer user account may include an entity that is not an entity of the service provider. For example, for a credit card service provider, peer entities may include credit card holders. In another example, for a retail service provider, peer entities may include customers of the retail service provider having user accounts associated with an online retail platform. In various embodiments, a peer or peer user account may include an entity that is not a service representative (for instance, a customer service representative) of the service provider. For example, for a healthcare service provider, peer entities may include patients and/or medical professionals (for instance, a physician or physician employee) of the healthcare service provider. In exemplary embodiments, a peer or peer entity may be or may include a computing device associated with a user account. For example, when establishing a user account, a user may register a computing device (for instance, a smart phone) with the user account. Embodiments are not limited in this context.

Computing device 110 may be a server or host computing device or system for the service provider. Computing devices 160*a-n* may be client computing devices operated by users to access services of the service provider, for example, implemented at least in part via services logic 120. Computing devices 160*a-n* may be or may include smart phones, tablet computing devices, laptop computing devices, PCs, and/or the like. In various embodiments, computing devices 160*a-n* may include processing circuitry 165, memory unit 180, transceiver 190, display 192, and/or I/O 192. Computing devices 160*a-n* may include services logic 170 operative to execute a client services application 184. In various embodiments, client services application 184 may be a client application, internet browser application and/or module, mobile application ("mobile app" or "app"), and/or the like operative to interact with services application 136. For example, services logic 170 may provide client access to account information 132, transaction information 134, and/or services provided by services logic 120 and/or components thereof.

Figure 2A:
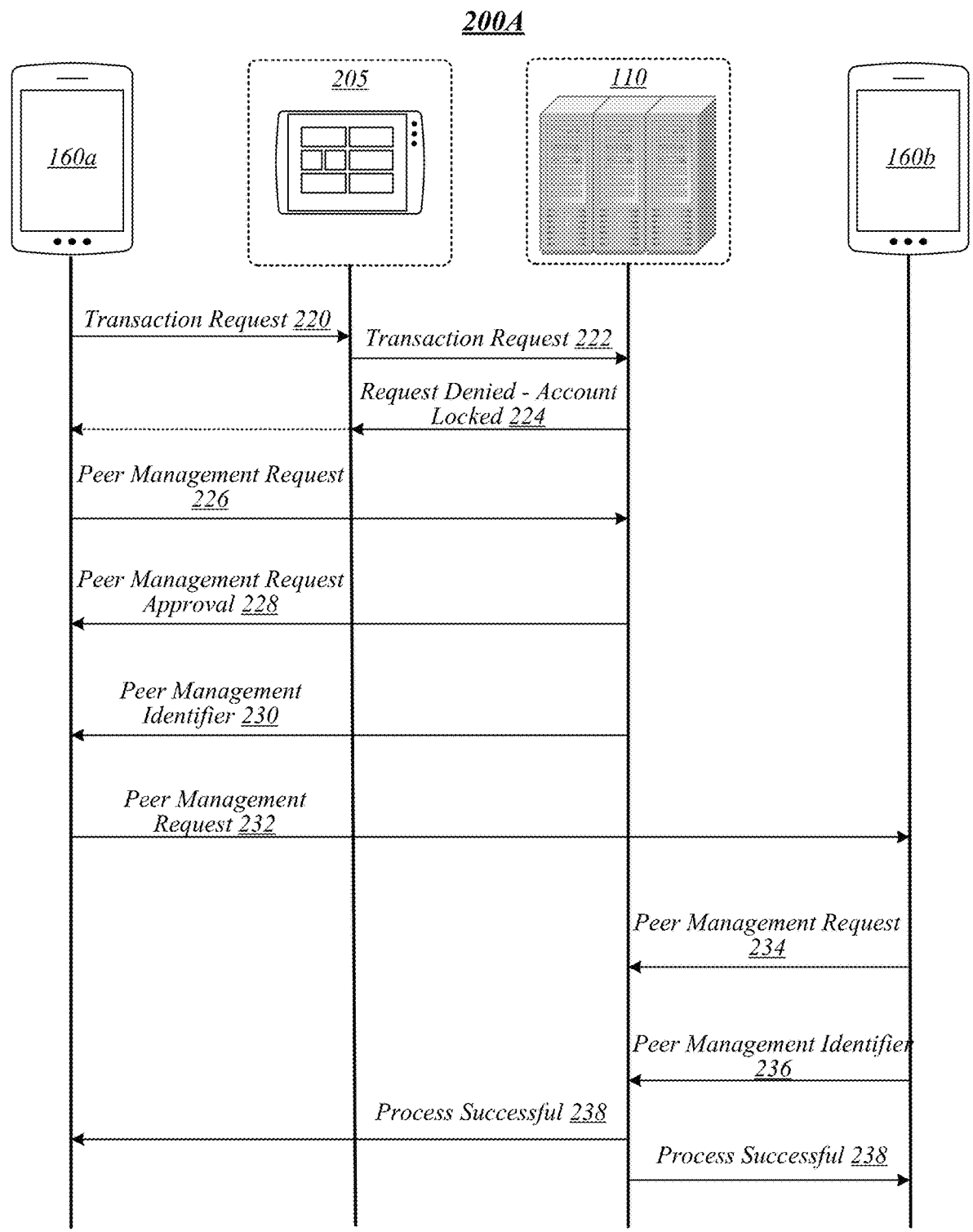
FIG. 2A depicts an illustrative message sequence for a peer management process according to some embodiments.
Figure 2B:
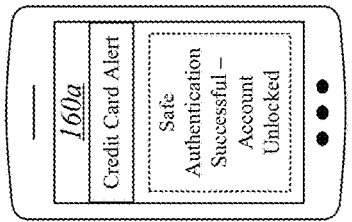
FIG. 2B depicts an illustrative user interface sequence for a peer management process of FIG. 2A according to some embodiments.
Figure 2B:
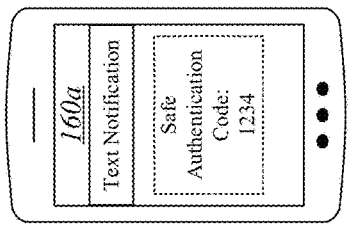
Figure 2B:
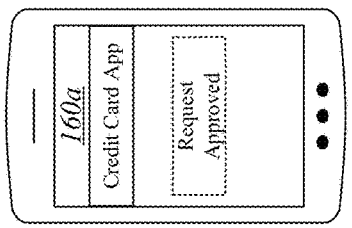
Figure 2B:
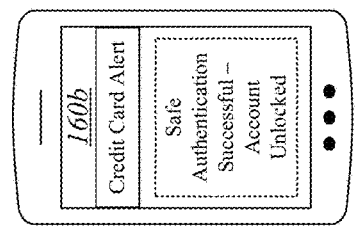
Figure 2B:
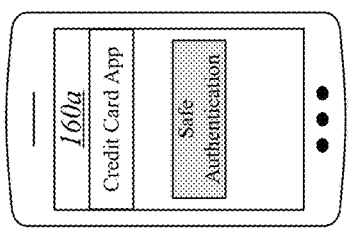
Figure 2B:
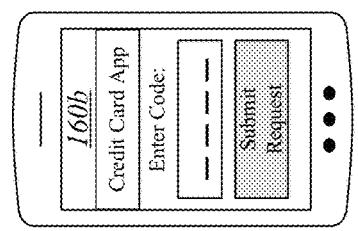
Figure 2B:
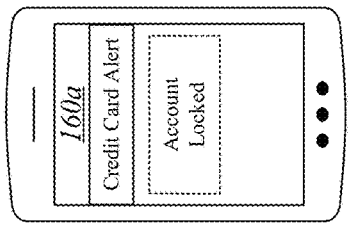
Figure 2B:
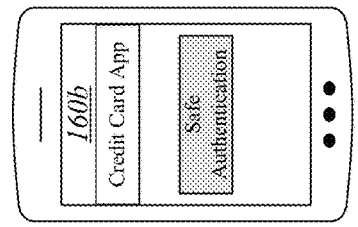

In various embodiments, services logic 170 may include peer management logic 174 to perform a peer management process according to some embodiments. For example, computing devices 160*a-n* may perform, in combination with computing device 110, a peer management process according to some embodiments. FIG. 2A depicts an illustrative message sequence for a peer management process according to some embodiments. FIG. 2B depicts an illustrative user interface sequence for a peer management process of FIG. 2A according to some embodiments.

As shown in FIG. 2A, a sequence 200A may include a transaction request 220 associated with computing device 160*a* (or a user associated with computing device 160*a*) may be transmitted to computing device 110. For example, transaction request 220 may be a credit card transaction initiated at a point-of-sale (POS) device 205 of a retailer. POS device 205 may transmit transaction request 222 to computing device 110 for processing. Computing device 110 may process transaction request 222 and determine that the request should be denied and/or that the user account associated with the transaction is or should be locked. For example, computing device 110 may determine that transaction request 222 is an unauthorized or potentially fraudulent transaction and, for instance, via account status logic 122, change the status of the user account and/or transaction. Computing device 110 may send a request denied and/or account locked 224 message to POS device 205. In some embodiments, computing device 110 may transmit request denied and/or account locked 224 to computing device 160*a* (for instance, via text, email, application alert, and/or the like). For example, as depicted in FIG. 2B, computing device 160*a* may display interface 250 of an account locked credit card alert notification.

Computing device 160*a* may submit a peer management request 226, for instance, via services application 184 executing on computing device 160*a*. For example, a user may open services application 184 on computing device 160*a* and login to their account. In some embodiments, services application 184 may include a peer management service for unlocking an account via peer management processes according to various embodiments. For example, as depicted in interface 252 of FIG. 2B, the user may initiate a "safe authentication" peer management process via services application 184 (for instance, a credit card application) that may trigger transmittal of peer management request 226 to computing device 110. Peer management logic 124 may determine whether the account and/or transaction may be unlocked or otherwise managed via a peer management process according to some embodiments. For example, a user account and/or transaction may be associated with a peer management process score. In some embodiments, the peer management process score may be a safe authentication score. The peer management process score may be a value indicating whether the account or transaction may be unlocked or otherwise managed via a peer management process. If the peer management process score is over (or otherwise within) a threshold (for instance, a peer management process threshold or safe authentication threshold), then the account and/or transaction is eligible to be unlocked or otherwise managed via a peer management process. If the peer management process score is below (or otherwise outside of) a threshold (for instance, a peer management process threshold or safe authentication threshold), then the account and/or transaction is ineligible to be unlocked or otherwise managed via a peer management process. In some embodiments, the peer management process score may be based on various factors (for instance, peer management approval factors). For example, for a credit card service provider, factors may include, without limitation, risk factors, account history, transaction location, retailer, transaction amount, transaction frequency, and/or the like.

In the embodiment depicted in FIG. 2A, computing device 110 determined that the peer management process score is within the threshold to allow for the peer management process. Accordingly, computing device 110 transmits a peer management request approval 228 to computing device 160*a*. For example, as depicted in interface 254 of FIG. 2B, a credit card application executed on computing device 160*a* may provide a graphical indicator that the safe authentication process has been approved.

In some embodiments, peer management request 226 and/or peer management request approval are not required as part of a peer management process. For example, in various embodiments, each time that an account is locked, services logic 120 (for instance, via peer management logic) may determine whether the account and/or transaction is eligible to be unlocked or otherwise managed via a peer management process (even in the absence of a user request). When a user accesses their user account via services application 184, there may be an indicator (for instance, a graphical user interface (GUI) object) signifying that a peer management process is available. The indicator may be or may serve the purpose of peer management request approval 228. The user may initiate the peer management process via the indicator (or selection of another application object).

In some embodiments, computing device 110 may transmit a peer management identifier 230 to computing device 160*a*. In various embodiments, peer management identifier may be a unique identifier for the peer management process sent via email, text, application notification, and/or the like. In exemplary embodiments, a peer management identifier may include letters, numbers, images, and/or the like. For example, as depicted in interface 256 of FIG. 2B, computing device 160*a* may receive a safe authentication code from computing device 110 (for instance, as a text message, email, application notification, and/or the like).

In some embodiments, a peer user associated with computing device 160*b* may become aware of the peer management request associated with computing device 160*a*. For example, in some embodiments, computing device 160*a* may transmit a peer management request 232 via services application 184 to computing device 160*b*. In various embodiments, a user may have a list of potential peer management accounts accessible via services application 184. The user may select a peer management account to trigger peer management request 232. In other embodiments, the user associated with computing device 160*a* may contact the user associated with computing device 160*b* via various other methods (such as out-of-band, verbal, email, telephone call, text message, and/or the like) to request a peer management process.

In some embodiments, the affected user may know and/or be with the owner of a peer management user account. In this manner, the affected user may ask the owner of a peer management user account to initiate a peer management process. In some embodiments, a service provider may designate various individuals to be peer management accounts, such as management level individuals of a business (for instance, with certain restrictions, such as not being able to unlock accounts locked due to transactions at your business).

Computing device 160*b* may transmit a peer management request 234 to computing device 110, for instance, via services application 184. For example, as depicted in interface 260 of FIG. 2B, computing device 260*b* may initiate a safe authentication function from within a credit card application. As part of peer management request 234 or as a separate peer management identifier 236, information identifying the user associated with the peer management process may be provided to computing device 110. For example, peer management request 234 and/or peer management identifier 236 may include, without limitation, a name, a phone number, an email address, a user name, a code, a key, an image, a file, a QR code, and/or the like. In some embodiments, computing device 110 may send a code or other identifier to computing device 160*a*. The code may be shared with the user of computing device 160*b* and provided to computing device 110 as part of peer management request 234 or as a separate peer management identifier 236. For instance, the user of computing device 160*b* may enter or scan the code into services application 184 via an I/O device 194 of computing device 160*b* as part of peer management request 234 or as a separate peer management identifier 236. In this manner, computing device 110 may ensure that the user of computing device 160*a* has initiated or is otherwise involved with the peer management process because the user of computing device 160*a* must share the identifier with the user of computing device 160*b*. For example, as depicted in interface 262 of FIG. 2B, computing device 160*b* provides an interface to enter the safe authentication code provided to computing device 160*a* as depicted in interface 256.

If the peer management process is successful, computing device 110 may send a process successful message 238 to computing device 160*a* and/or computing device 160*b*. For example, as depicted in interfaces 258 and 264 of FIG. 2B, a "safe authentication successful—account unlocked" message may be sent to computing device 160*a* and/or 160*b*.

Figure 2C:
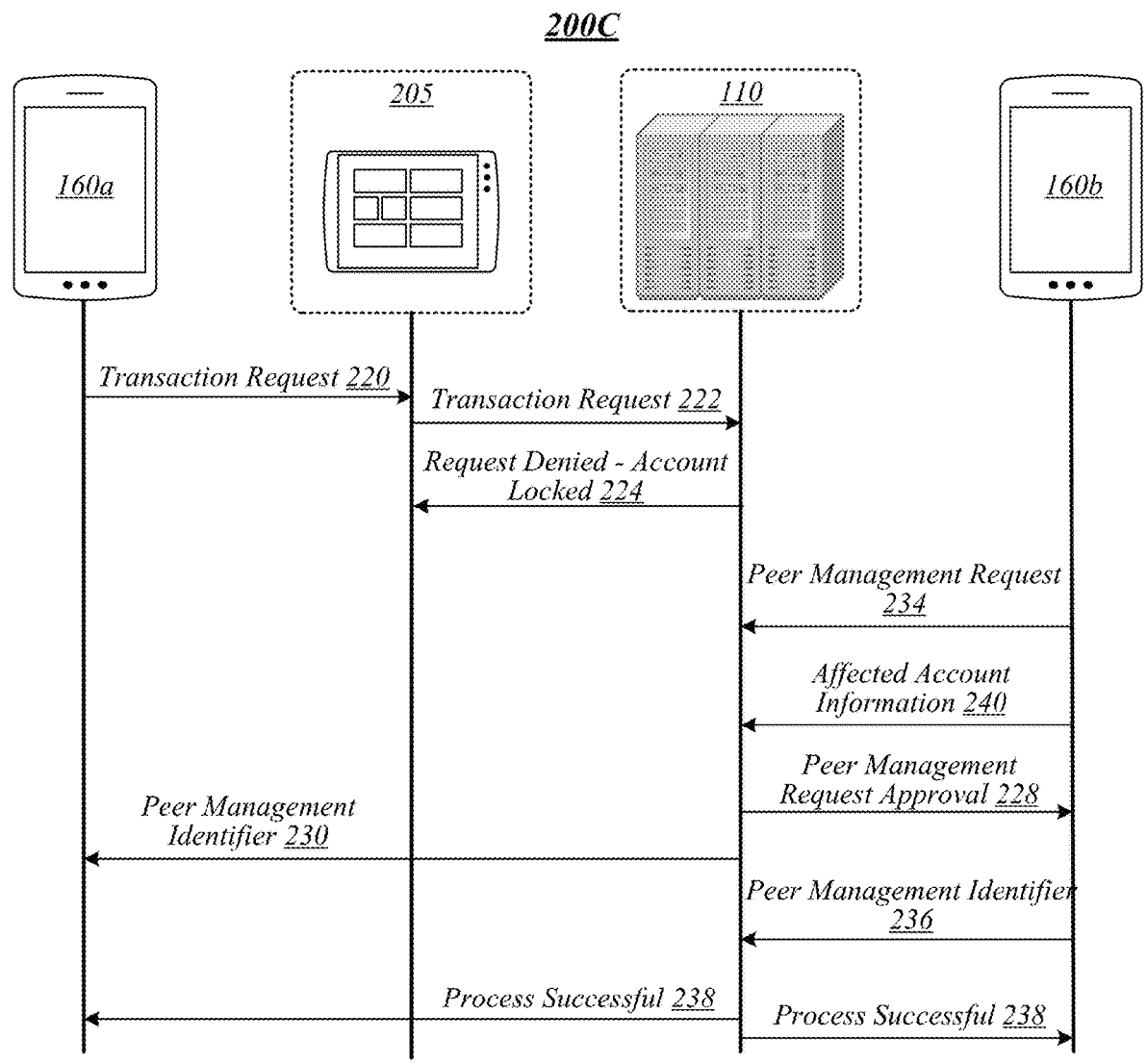
FIG. 2C depicts an illustrative message sequence for a peer management process according to some embodiments.
Figure 2D:
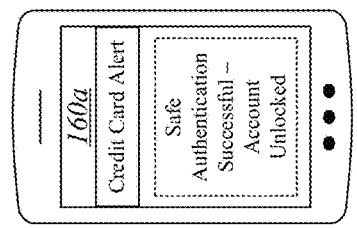
FIG. 2D depicts an illustrative user interface sequence for a peer management process of FIG. 2C according to some embodiments
Figure 2D:
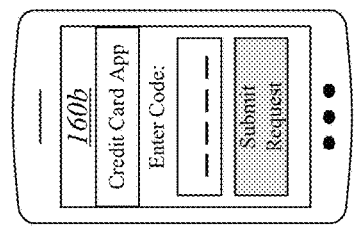
Figure 2D:
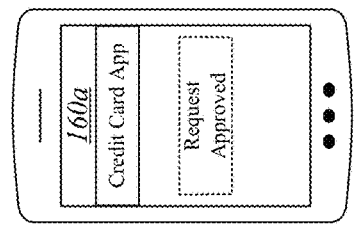
Figure 2D:
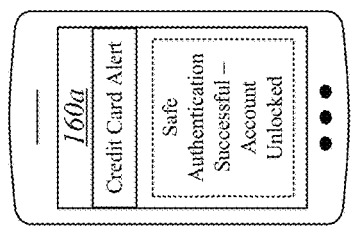
Figure 2D:
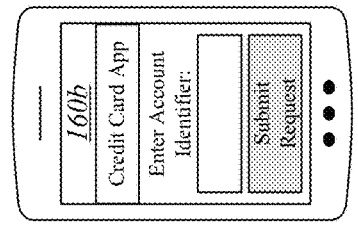
Figure 2D:
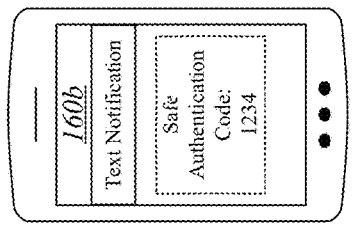
Figure 2D:
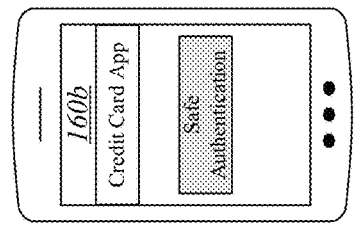

FIG. 2C depicts an illustrative message sequence for a peer management process according to some embodiments. FIG. 2D depicts an illustrative user interface sequence for a peer management process of FIG. 2C according to some embodiments As shown in FIG. 2C, a sequence 200C may include a transaction request 220 associated with computing device 160*a* (or a user associated with computing device 160*a*) may be transmitted to computing device 110. Computing device 110 may process transaction request 222 and determine that the request should be denied and/or that the user account associated with the transaction is or should be locked. Computing device 110 may send a request denied and/or account locked 224 message to POS device 205 and/or to computing device 160*a*.

Computing device 160*b* may submit a peer management request 226, for instance, via services application 184 executing on computing device 160*b*. For example, a user may open services application 184 on computing device 160*b* and login to their account. As depicted in interface 280 of FIG. 2D, the user may initiate a "safe authentication" peer management process via services application 184 (for instance, a credit card application) that may trigger transmittal of peer management request 234 to computing device 110. As part of peer management request 234 or as a separate affected account identifier 240, information identifying the user and/or user account associated with the peer management process may be provided to computing device 110. For example, as depicted in interface 282 of FIG. 2D, the computing device may provide an account identifier with a request submission. The account identifier may provide information to computing device 110 to determine the affected user account that is the subject of the peer management process.

In the embodiment depicted in FIG. 2C, computing device 110 approved the peer management process according to various embodiments. Accordingly, computing device 110 transmits a peer management request approval 228 to computing device 160*b*. For example, as depicted in interface 284 of FIG. 2D, a credit card application executed on computing device 160*b* may provide a graphical indicator that the safe authentication process has been approved.

In some embodiments, computing device 110 may transmit a peer management identifier 230 to computing device 160*a*. For example, as depicted in interface 270 of FIG. 2D, computing device 160*a* may receive a safe authentication code from computing device 110. As part of affected account information 240 or as a separate peer management identifier 236, information identifying the user associated with the peer management process may be provided to computing device 110 via computing device 160*b*. For example, as depicted in interface 286 of FIG. 2D, computing device 160*b* may provide an interface to enter the safe authentication code provided to computing device 160*a* as depicted in interface 270.

If the peer management process is successful, computing device 110 may send a process successful message 238 to computing device 160*a* and/or computing device 160*b*. For example, as depicted in interfaces 272 and 288 of FIG. 2D, a "safe authentication successful—account unlocked" message may be sent to computing device 160*a* and/or 160*b*.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by executable computer instructions stored on a non-transitory computer readable medium or machine-readable medium, such as an optical, magnetic or semiconductor storage. The embodiments are not limited in this context.

Figure 3:
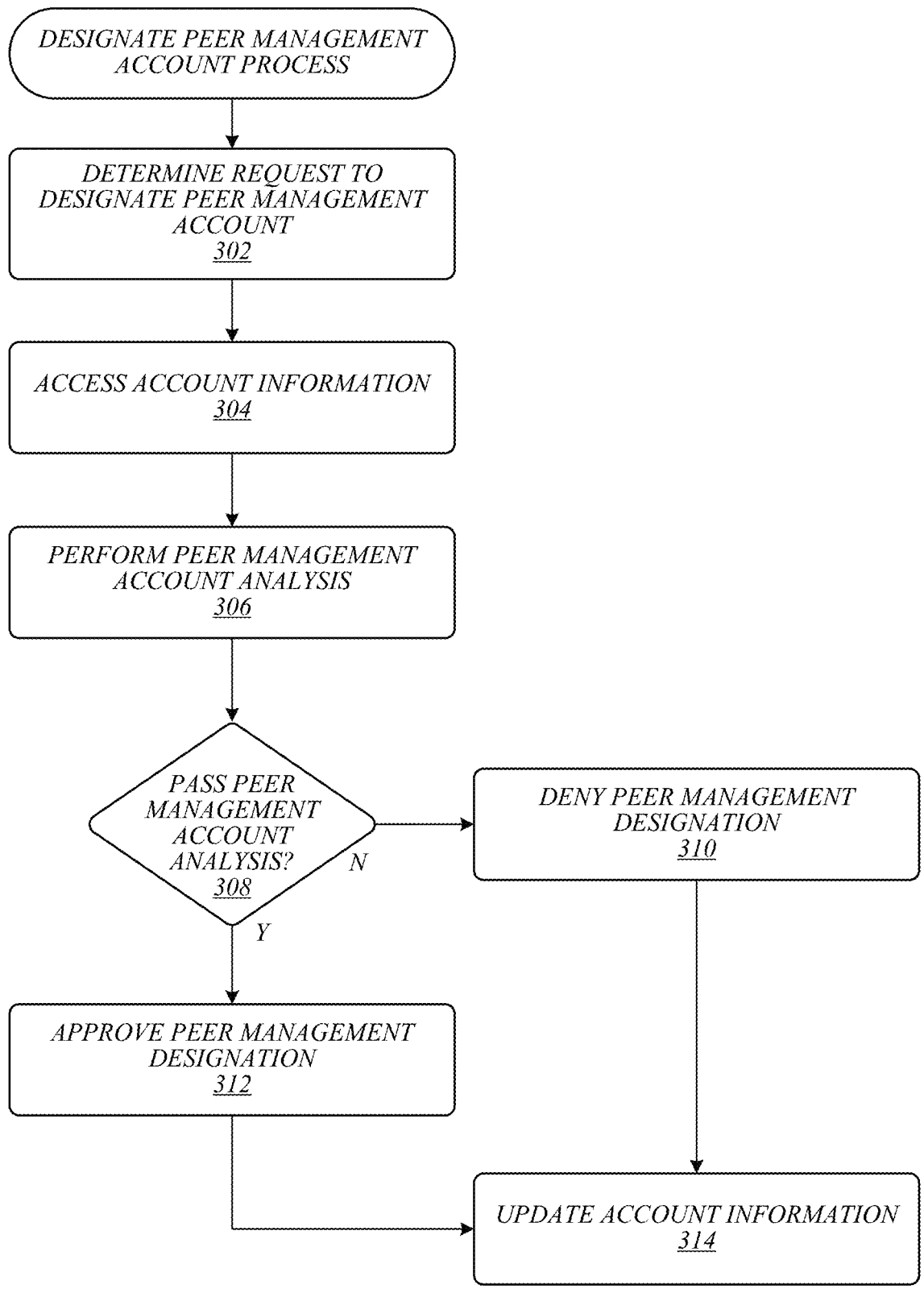
FIG. 3 illustrates an embodiment of a first logic flow.

FIG. 3 illustrates an embodiment of a logic flow 300. Logic flow 300 may be representative of some or all of the operations executed by one or more embodiments described herein, such as computing device 110. In some embodiments, logic flow 300 may be representative of some or all of the operations of a process for designating a peer management account process according to some embodiments.

At block 302, logic flow 300 may determine a request to designate a peer management account. For example, services application 184 of computing device 160*a-n* may provide an interface for requesting that a user account be designated as a peer management account. In another example, services application 136 of computing device 110 may analyze user accounts for candidates to be peer management accounts. In this example, services application 136 may transmit a message to computing devices 160*a-n* associated with candidate accounts soliciting whether the corresponding users are interested in being peer management accounts. Accordingly, the request of block 302 may be initiated by a user and/or a services application. In exemplary embodiments, a service provider may provide various incentives to encourage users to have a peer management account.

Logic flow 300 may access account information at block 304. For example, services application 136 may access account information 132 associated with a user account associated with a request to be a peer management account. In various embodiments, account information 132 may be or may access include transaction information 134 associated with the user account. At block 306, logic flow 300 may perform a peer management account analysis. For example, services application 136 (for instance, via peer management logic 124) may analyze account information 132 to determine whether the user account meets peer management account criteria. In some embodiments, peer management account criteria may include criteria associated with risk, security, and/or other factors to indicate that the user account is associated with a safe, secure, verified, or otherwise low-risk user. For example, peer management account criteria may include a peer management account score indicating a risk level for the user. For a credit card services provider, the risk level may include length of credit card membership, demographic information, geographic location, credit score, number of fraudulent transactions, credit card balance, income, and/or the like.

At block 308, logic flow 300 may determine whether the user account has passed the peer management account analysis. For example, in some embodiments, if the peer management account score is over (or otherwise within) a threshold (for instance, a peer management account score threshold) value, then the user account has passed the peer management account analysis. If the peer management account score is under (or otherwise outside of) the threshold value, then the user account has failed the peer management account analysis. In some embodiments, certain user or user account characteristics may be designated as risk characteristics (or "red flags"), such as age, geographic location, a credit score below a threshold amount, a bankruptcy, delinquency, and/or the like. In some embodiments, a user account may fail the peer management account analysis responsive to one or more red flags (for instance, regardless of a peer management account score). In some embodiments, the high-risk characteristics may have severity designations or scores. For example, a bankruptcy may have a severe designation (or a high/low score or weight depending on the scale), while a delinquency of less than 30 days may have a minor designation (or low/high score or weight depending on the scale). Accordingly, in some embodiments, the peer management account analysis may be determined based on a peer management account score, red flags, combinations thereof, and/or the like. Embodiments are not limited in this context.

If logic flow 300 determines that the user account has failed the peer management account analysis at block 308, logic flow 300 may deny the peer management designation at block 310 and update the account information at block 314 to indicate that the user account has failed the peer management account analysis. If logic flow 300 determines that the user account passes the peer management account analysis at block 308, logic flow 300 may approve the peer management designation at block 312 and update the account information at block 314 to indicate that the user account has passed the peer management account analysis and/or is a peer management account.

Figure 4:
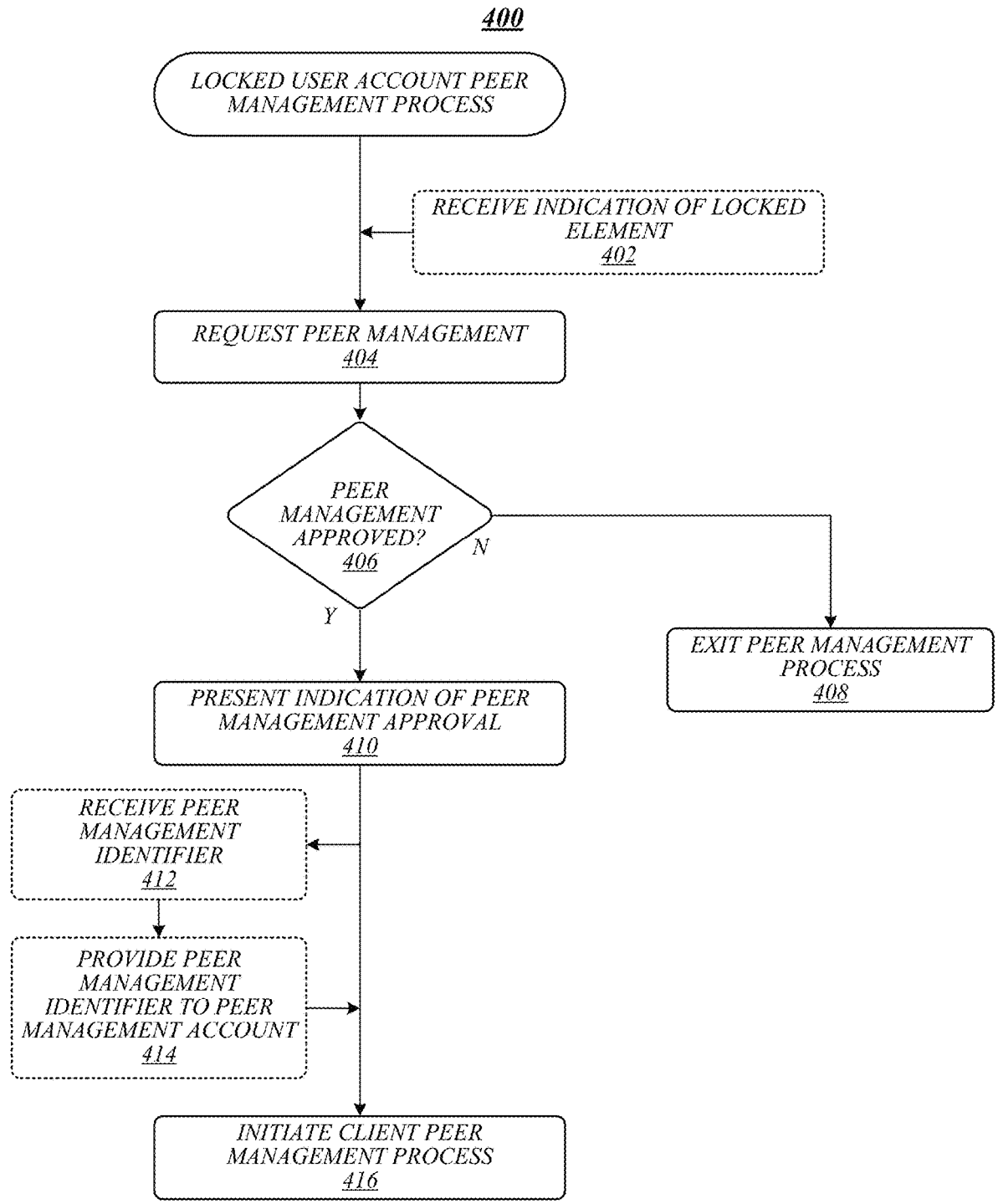
FIG. 4 illustrates an embodiment of a second logic flow.

FIG. 4 illustrates an embodiment of a logic flow 400. Logic flow 400 may be representative of some or all of the operations executed by one or more embodiments described herein, such as one of computing devices 160*a-n* (for instance, computing device 160*a* as depicted in FIG. 2). In some embodiments, logic flow 400 may be representative of some or all of the operations of a process for a peer management process by a locked user account.

At block 402, logic flow 400 may receive an indication of a locked element. For example, computing device 160*a* may receive a message from computing device 110 indicating that a user account has been affected. For example, the user account and/or an aspect thereof (for instance, certain transactions) has been locked, frozen, or otherwise inactive. For example, a credit card holder may have their credit card locked responsive to a potentially fraudulent transaction as determined by computing device 110.

Logic flow 400 may request peer management at block 404. For example, a user may request to have their account unlocked or otherwise managed by a peer account via services application 184 of computing device 160a. At block 406, logic flow 400 may receive an indication of whether peer management has been approved. For example, peer management logic 124 of computing device 110 may perform a peer management approval analysis (see, for instance, FIG. 6A) to determine whether the account or transaction may be unlocked or otherwise managed via a peer management process. If the peer management process is not approved at block 406, logic flow 400 may exit the peer management process at block 408. If the peer management process is approved at block 406, logic flow 400 may present an indication of peer management approval at block 410 and initiate a client peer management process at block 416. In some embodiments, logic flow 412 may, for example, as part of the client peer management process, receive a peer management identifier at block 412 and/or provide a peer management identifier to a peer management account at block 414.

Figure 5:
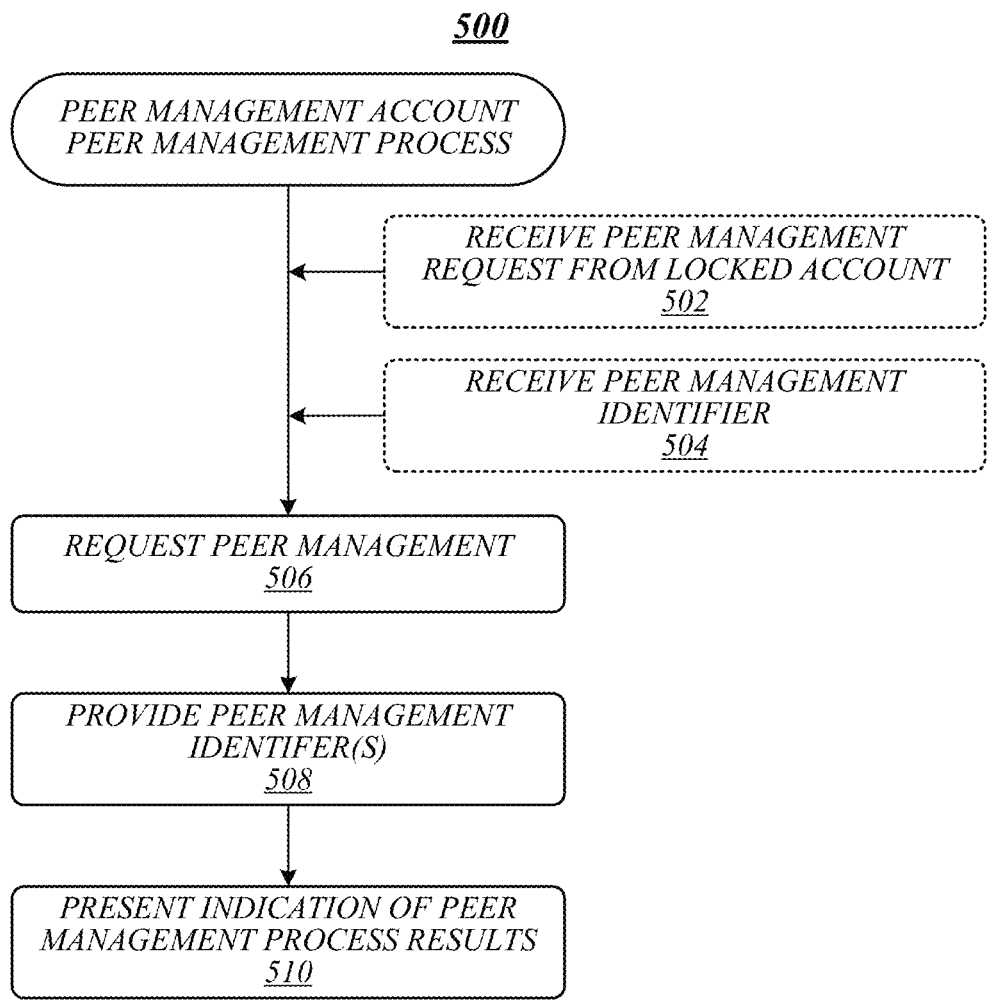
FIG. 5 illustrates an embodiment of a third logic flow.

FIG. 5 illustrates an embodiment of a logic flow 500. Logic flow 500 may be representative of some or all of the operations executed by one or more embodiments described herein, such as one of computing devices 160a-n (for instance, computing device 160b as depicted in FIG. 2). In some embodiments, logic flow 500 may be representative of some or all of the operations of a process for a peer management process by a peer management account.

At block 506, logic flow 500 may request peer management. For example, a user may login to a peer management user account via services application 184 of computing device 160b. Services application 184 may provide a function for requesting a peer management process of another account. In some embodiments, logic flow 500 may receive a peer management request from a locked account at block 502. For example, a user of a locked or otherwise affected account may have an option, for example via services application 184 being executed on computing device 160a, to send a request to one or more peer management accounts to initiate a peer management processes. In various embodiments, logic flow 500 may receive a peer management identifier at block 504. For example, services application 136 of computing device 110 may generate a peer management identifier for the peer management process. In some embodiments, the user of the locked or otherwise affected account and/or services application 136 of computing device 110 may provide the peer management identifier to computing device 160b (for instance, via email, text, application notification, services application 184, and/or the like).

At block 508, logic flow 500 may provide peer management identifiers. For example, a peer management request initiated by a peer management account may include or require peer management identifiers, for instance, to identify the account to be unlocked or otherwise manage and/or to ensure that the user associated with the locked or otherwise affected account is involved in the peer management process. Logic flow 500 may present an indication of peer management process results at block 510. For example, services application 184 of computing device 160b may present via display 192 whether the peer management process was successful or unsuccessful.

Figure 6A:
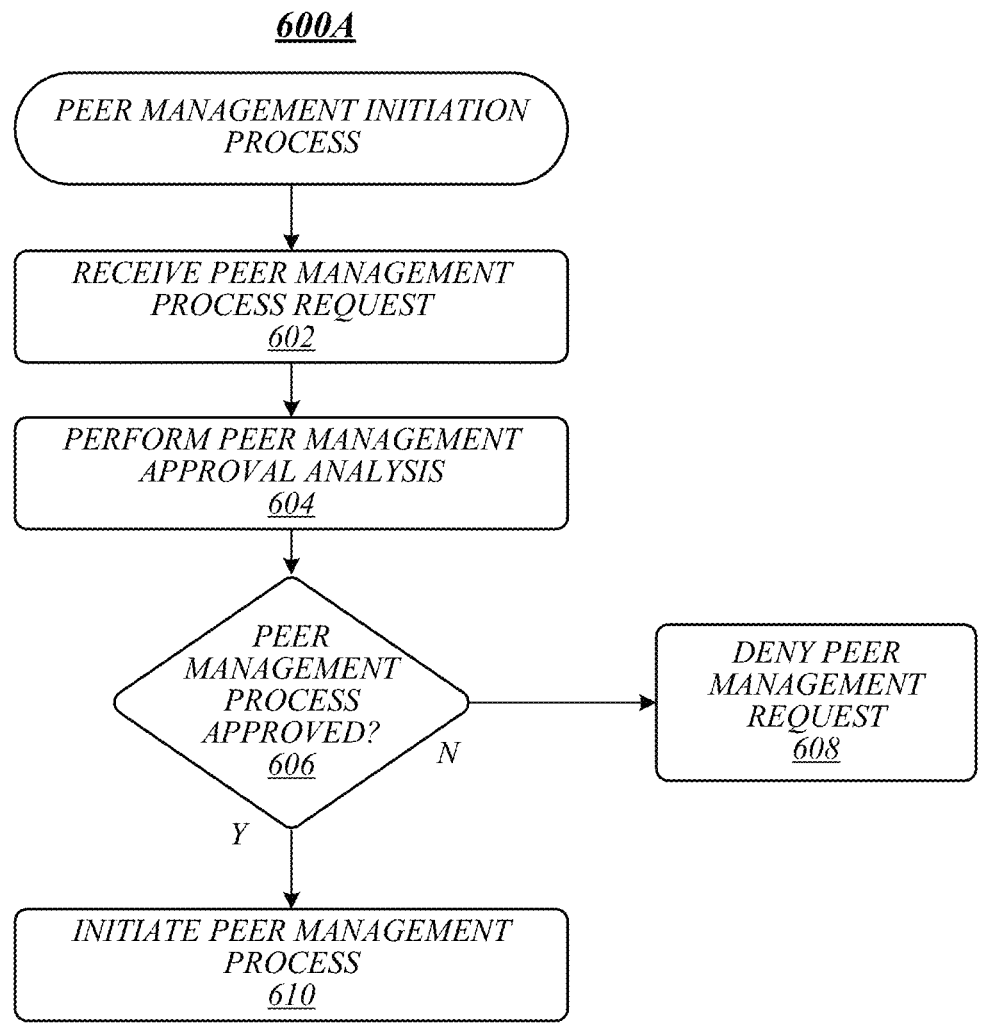
FIG. 6A illustrates an embodiment of a fourth logic flow.

FIG. 6A illustrates an embodiment of a logic flow 600A. Logic flow 600A may be representative of some or all of the operations executed by one or more embodiments described herein, such as computing device 110. In some embodiments, logic flow 600A may be representative of some or all of the operations of a process for initiating a peer management process by a computing device or system of a service provider.

At block 602, logic flow 600A may receive a peer management request. For example, services application 136 may receive a peer management request from computing device 160a and/or computing device 160b. Logic flow 600A may perform peer management approval analysis at block 604. For example, services application 136 (for instance, via peer management logic 124) may perform a peer management process analysis to determine whether an account and/or transaction may be managed via a peer management process. In some embodiments, peer management application 136 may perform the peer management process analysis by analyzing account information 132 and/or transaction information 134 to determine whether the affected account and/or transaction may be unlocked or otherwise managed by the peer management process. In some embodiments, the affected account and/or transaction may be associated with an event value or score for purposes of the peer management process analysis. For example, for a potentially fraudulent transaction associated with a credit card at a particular merchant (for instance, a "fraud event"), a safe authentication value may be determined for the fraud event. The safe authentication value may be determined based on various factors including, without limitation, a risk level associated with the transaction, a risk level associated with the user account, transaction location, transaction merchant, and/or the like. In some embodiments, the event value (such as a safe authentication value) may operate to indicate a level of risk associated with the transaction and/or the associated user account. In some embodiments, the event value may be a numerical value. In other embodiments, the event value may be a symbol or word (for instance, "pass," "fail," "approved," "denied," and/or the like).

At block 606, logic flow 600A may determine whether the peer management process is approved for unlocking or otherwise managing the account. For instance, if the event value is below (or otherwise outside of) a threshold, then logic flow 600A may deny the peer management process at block 608. If the event value is above (or otherwise within) a threshold, then logic flow 600A may initiate the peer management process at block 610 (see, for example, FIG. 6B).

Figure 6B:
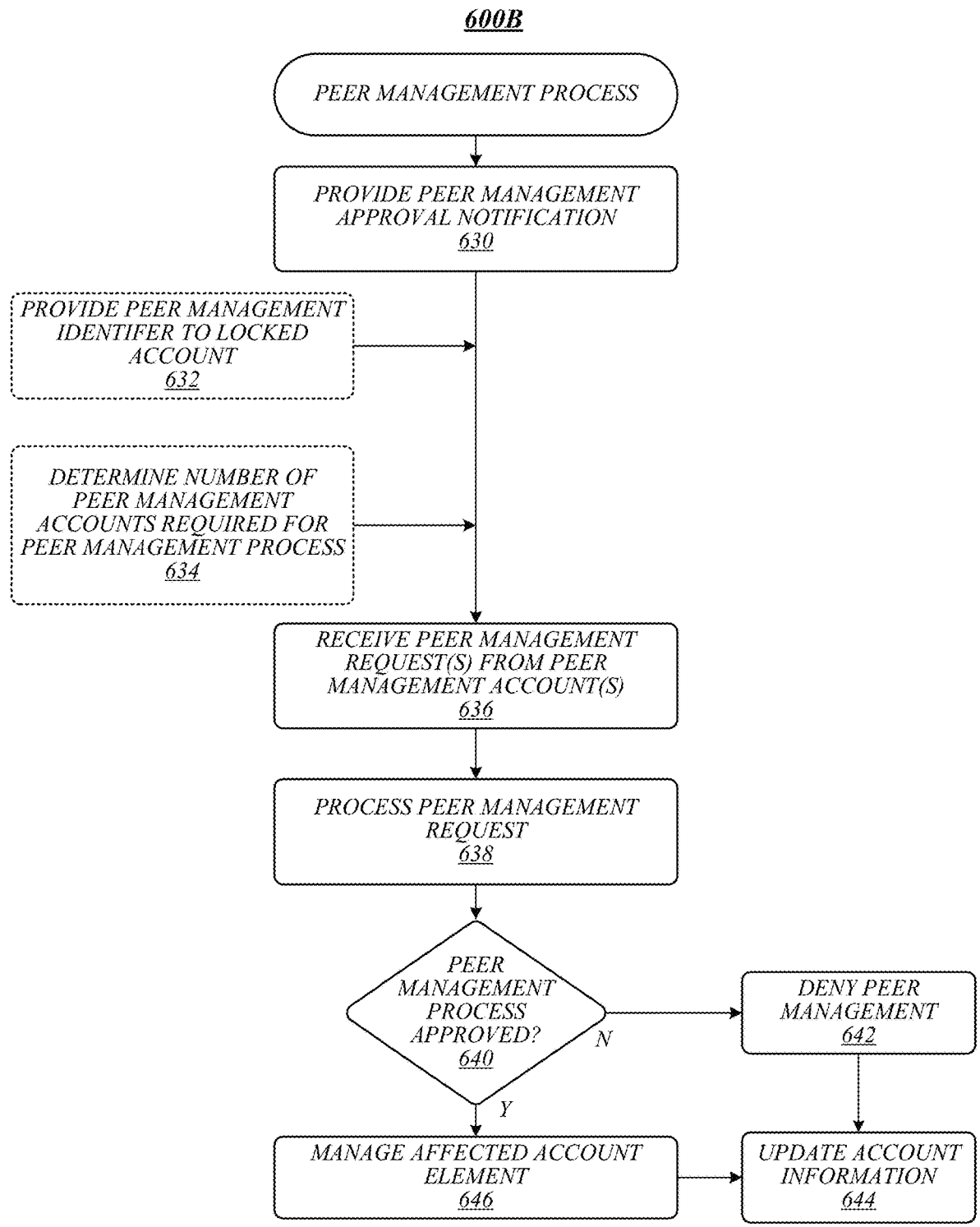
FIG. 6B illustrates an embodiment of a fifth logic flow.

FIG. 6B illustrates an embodiment of a logic flow 600B. Logic flow 600B may be representative of some or all of the operations executed by one or more embodiments described herein, such as computing device 110. In some embodiments, logic flow 600B may be representative of some or all of the operations of a process for performing a peer management process by a computing device or system of a service provider.

At block 650, logic flow 600B may provide peer management approval notification. For example, services logic 120 (for instance, via peer management logic 124) may provide a message to computing device 160a and/or computing device 160b that the peer management process has been approved and/or is in progress.

In some embodiments, logic flow 600B may provide a peer management identifier to the locked account at block 652. For example, peer management logic 124 may send a peer management identifier to computing device 160a. In various embodiments, the peer management identifier may include a code, bar code, QR code word, number, image, combinations thereof, and/or the like. The peer management identifier may be provided to the user attempting to manage the affected account via the peer management process (for instance, the user of computing device 160b) by the user of the affected account (for instance, the user of computing device 160a). In some embodiment, the peer management identifier may be provided via various methods, such as through email, text message, peer management logic 174, bar code reader application, QR reader application, file transfer, near field communication (NFC), combinations thereof, and/or the like. In other embodiments, the peer management identifier may be provided via various out-of-band methods, such as verbally, visually (for instance, allowing the user to view display 192 of computing device 160a to see the peer management identifier), and/or the like. Embodiments are not limited in this context.

In exemplary embodiments, logic flow 600B may determine a number of peer management accounts required for the peer management process at block 654. For example, as part of the peer management process analysis, peer management logic 124 may determine whether more than one peer management account is required to manage the affected account. The determination may be based on various factors, including the event score, risk characteristics (or "red flags"), combinations thereof, and/or the like. In various embodiments, peer management logic 124 may determine that a plurality of peer management accounts (for instance, two accounts, three accounts, four accounts, five accounts, and any value or range between any two of these values (including endpoints)) are required to manage the affected account. For example, if the event score is over a first threshold, one peer management account is required; if the event score is over a second threshold, two peer management accounts are required; and so on. In another example, if a risk characteristic (for instance, geographic location of transaction in a foreign country), then a plurality of peer management accounts (for instance, two accounts) are required.

At block 656, logic flow 600B may receive a peer management request from a peer management account. For example, peer management logic 184 of computing device 160b may transmit a peer management (or unlock) request to computing device 110 to manage an affected user account associated with computing device 160a. In various embodiments, the peer management request may include one or more peer management identifiers to identify the affected account. The peer management identifiers may include information associated with the affected user account, such as a user name, a password, an email address, address information, demographic information, a code provided to a computing device associated with the affected user account, combinations thereof, and/or the like.

Logic flow 638 may process the peer management request at block 638. For example, peer management logic 124 of computing device 110 may locate the affected account associated with the request, for instance, via the peer management identifier information in the peer management request. In some embodiments, peer management logic 124 may determine whether the affected user account is associated with a peer management process, for example, via a corresponding request from the affected user account and/or a code or other identifier sent to the affected user account (for instance, in block 632). Peer management logic 124 may perform authentication of the peer management request, such as whether the requesting account is a legitimate peer management account, whether the peer management account may manage the affected account, whether the affected account and/or transaction may be managed via a peer management process, and/or the like. In another example, if more than one peer management account is required, peer management logic 124 may determine whether the requisite number of peer management accounts have submitted peer management requests.

At block 640, logic flow 600B may determine whether the peer management process has been approved. For example, if peer management logic 124 determines that the peer management process has been approved, then logic flow 600B (for instance, via peer management logic 124 and/or account status logic 122) may manage (or unlock) the affected account element at block 646. In some embodiments, an account element may include a user account, transaction, or article associated with the use account (for instance, credit card, bank account, service resources, and/or the like). In another example, if peer management logic 124 determines that the peer management process has not been approved, then logic flow 600B (for instance, via peer management logic 124) may deny management of the affected account element via the peer management process. Logic flow 600B may update account information at block 644, for example, to indicate the results of the peer management process.

Figure 7A:
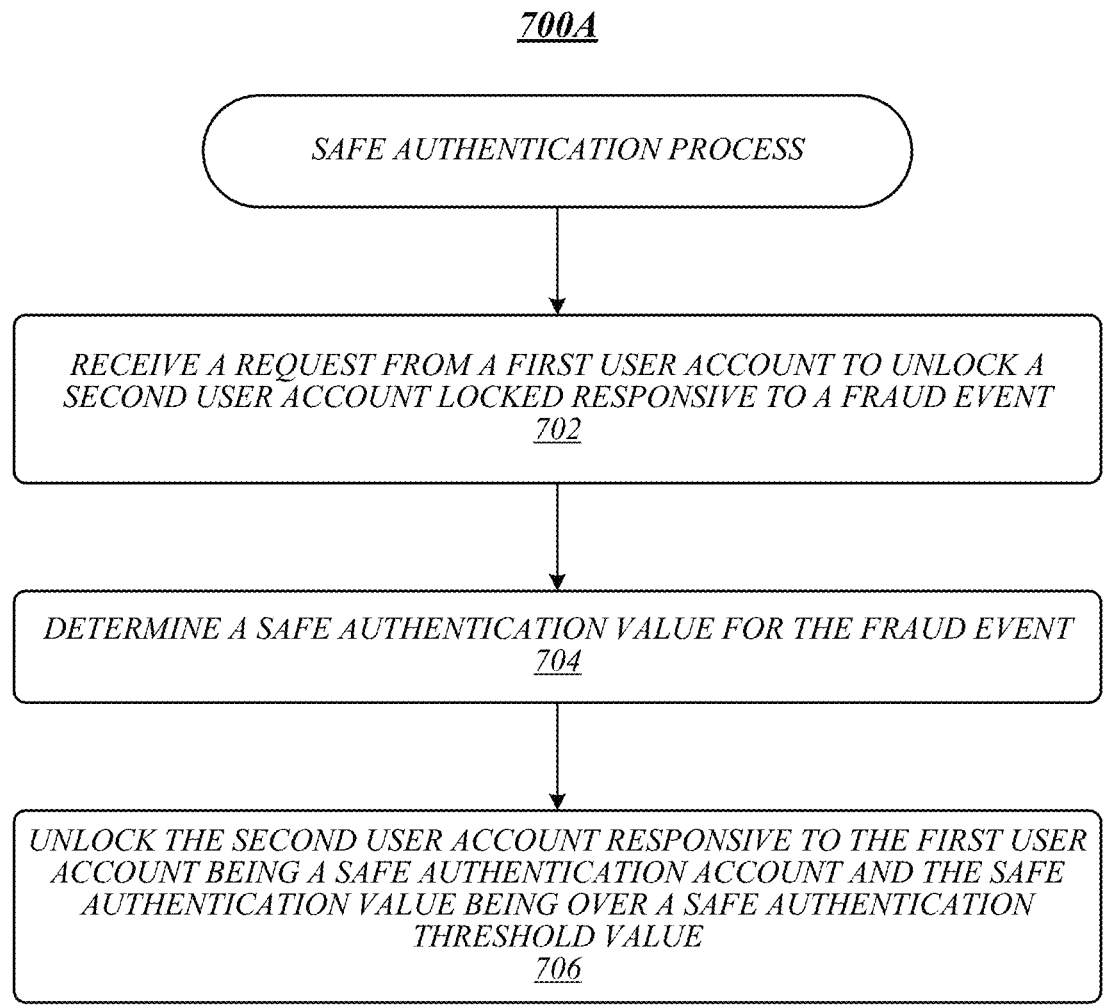
FIG. 7A illustrates an embodiment of a sixth logic flow.

FIG. 7A illustrates an embodiment of a logic flow 700A. Logic flow 700A may be representative of some or all of the operations executed by one or more embodiments described herein, such as computing device 110. In some embodiments, logic flow 700A may be representative of some or all of the operations of a safe authentication process according to some embodiments.

At block 702, logic flow 700A may receive a request from at least one first user account to unlock a second user account locked responsive to a fraud event. For example, a first user of computing device 160b may login into a financial services application (for instance, for managing credit card accounts). The financial services application may include a safe authentication function (for instance, a safe authentication version of a peer management function). The first user may select the safe authentication function to send a request to computing device 110 to unlock a second user account. For example, the second user account may be associated with computing device 160a. The second user account may be a credit card account locked due to a fraud event. In various embodiments, the fraud event may be a credit card transaction initiated at a retailer POS device that has triggered a potential fraud alert by a credit card services enterprise application (for instance, a version of services application 136).

Logic flow 700A may determine a safe authentication value for the fraud event at block 704. For example, the credit card services application may determine a value or score associated with the transaction. The value may be configured to indicate a risk level associated with the transaction and/or user account. For example, the value may be based on a merchant history or score, credit score, transaction location, transaction amount, transaction frequency (for instance, a number of transactions within a specified time period), combinations thereof, and/or the like.

At block 706, logic flow 700A may unlock the second user account responsive to the at least one first user account being a safe authentication account and the safe authentication value being over a safe authentication threshold value. For example, the credit card services enterprise application may determine whether the request is made from a safe authentication account (for instance, a safe authentication version of a peer management account) and whether the safe authentication value is over (or otherwise within) a safe authentication value threshold. If the requesting user account is a safe authentication account and the safe authentication value is over (or otherwise within) a safe authentication value threshold, the credit card services enterprise application may unlock the second user account.

Figure 7B:
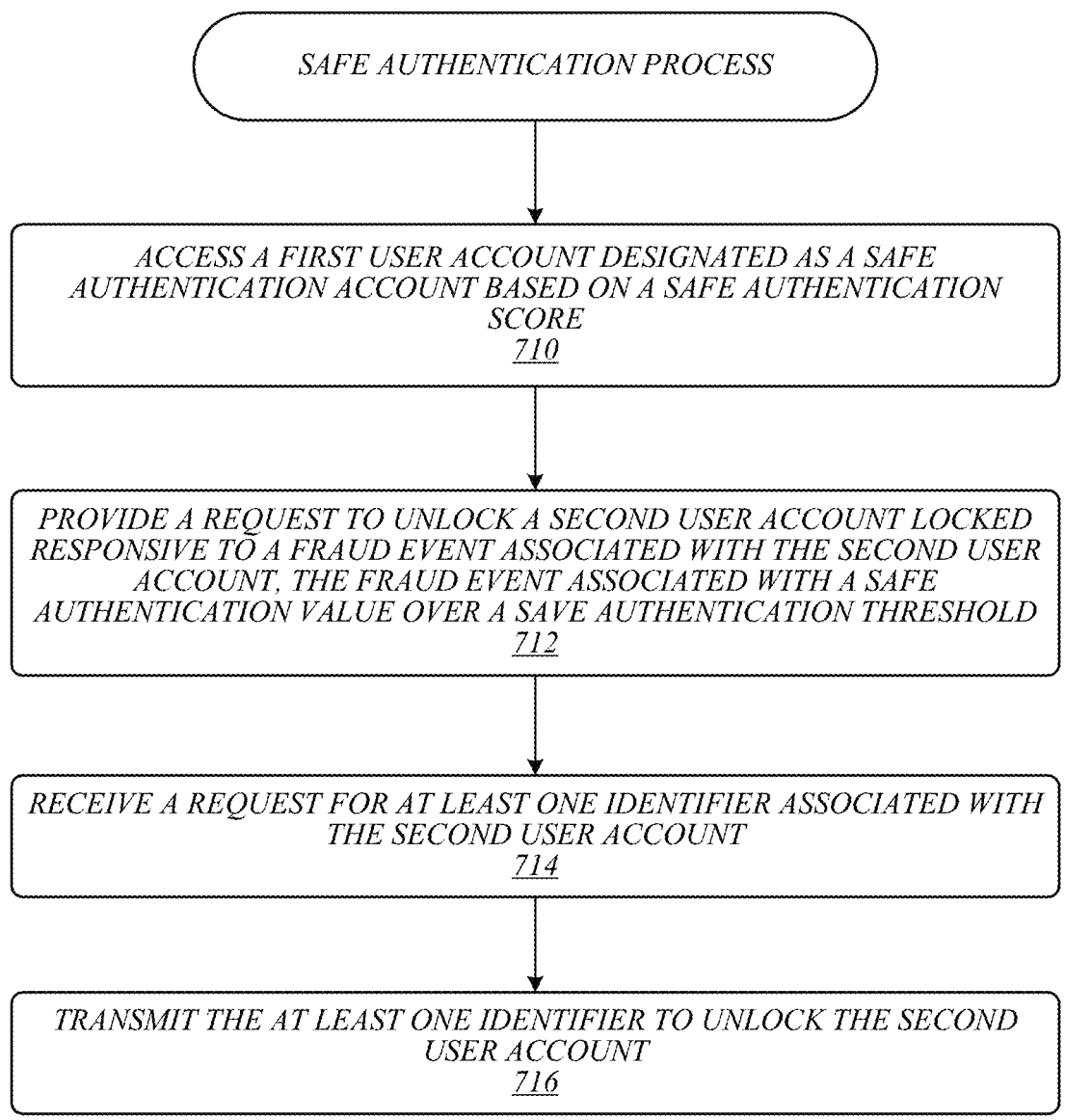
FIG. 7B illustrates an embodiment of a seventh logic flow.

FIG. 7B illustrates an embodiment of a logic flow 700B. Logic flow 700B may be representative of some or all of the operations executed by one or more embodiments described herein, such as computing device 160b. In some embodiments, logic flow 700B may be representative of some or all of the operations of a safe authentication process according to some embodiments.

At block 710, logic flow 700B may access a first user account designated as a safe authentication account based on a safe authentication score. For example, a user may login to user account of services application 184 on computing device 160b. The user account may be designated as a peer management or safe authentication account (for example, see FIG. 3).

Logic flow 700B may provide a request to unlock a second user account locked responsive to a fraud event associated with the second user account, the fraud event associated with a safe authentication value over a save authentication threshold at block 712. For example, computing device 160b may provide a peer management request 234 message to computing device 110. At block 714, logic flow 700B may receive a request for at least one identifier associated with the second user account. For example, computing device 160b may receive a request to provide an identifier, such as depicted in interfaces 282 and/or 286 of FIG. 2D. Logic flow 700B may provide the identifier in block 716. For example, computing device 160b may transmit an identifier, such as an email address, user name, code, and/or the like, entered by a user of computing device 160b to computing device 110.

Figure 8:
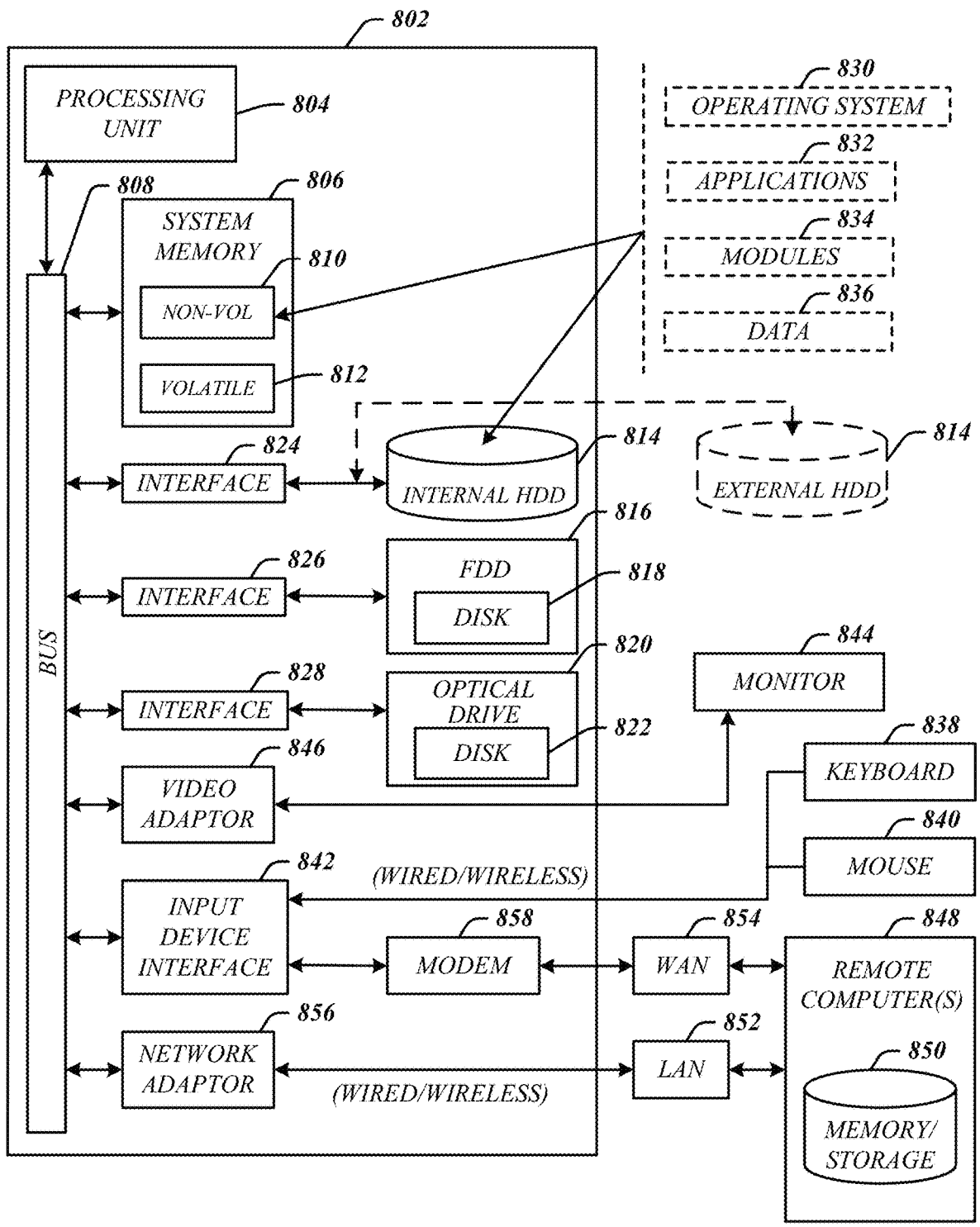
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of computing devices 110 and/or 160a-n. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of computing device 110

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808 but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The following include non-limiting example embodiments:

Example 1 is a computing device that may include a storage device, and logic, at least a portion of the logic implemented in circuitry coupled to the storage device, the logic to receive a request from at least one first user account to unlock a second user account locked responsive to a fraud event, determine a safe authentication value for the fraud event, and unlock the second user account responsive to the at least one first user account being a safe authentication account and the safe authentication value being over a safe authentication threshold value.

Example 2 is the computing device of Example 1, the logic to unlock the second user account responsive to receiving at least one identifier for the second user account from at least one first computing device associated with the at least one first user account.

Example 3 is the computing device of Example 2, the logic to send the at least one identifier to a second computing device associated with the second user account.

Example 4 is the computing device of Example 3, the at least one identifier comprising a secret code.

Example 5 is the computing device of Example 2, the at least one identifier comprising a profile element of the second user account, the profile element comprising at least one of an email address, a user name, a phone number, a device identifier, or an account identifier.

Example 6 is the computing device of Example 1, the logic to designate a user account as the safe authentication account based on a safe authentication score.

Example 7 is the computing device of Example 6, the logic to determine the safe authentication score based on transactions associated with the user account.

Example 8 is the computing device of Example 6, the logic to determine the safe authentication score based on a level of risk associated with the user account.

Example 9 is the computing device of Example 1, the at least one first user account and the second user account comprising peer accounts.

Example 10 is the computing device of Example 9, the peer accounts comprising at least one of a consumer credit card account, a business credit card account, a consumer bank account, or a business bank account.

Example 11 is the computing device of Example 1, the logic to unlock the second user account responsive to a plurality of successful requests from a plurality of user accounts if the safe authentication value is over a multiple user account threshold.

Example 12 is a computing device that may include a storage device, and logic, at least a portion of the logic implemented in circuitry coupled to the storage device, the logic to access a first user account designated as a safe authentication account based on a safe authentication score, provide a request to unlock a second user account locked responsive to a fraud event associated with the second user account, the fraud event associated with a safe authentication value over a save authentication threshold, receive a request for at least one identifier associated with the second user account, and transmit the at least one identifier to unlock the second user account.

Example 13 is the computing device of Example 12, the at least one identifier comprising at least one of a profile element of the second user account or a secret code transmitted to a second computing device associated with the second computing device.

Example 14 is the computing device of Example 12, the logic to determine the safe authentication score based on transactions associated with the at least one first user account.

Example 15 is the computing device of Example 12, the at least one first user account and the second user account comprising peer accounts.

Example 16 is a computer-implemented method, comprising, by a processor of a computing device receiving a request from at least one first user account to unlock a second user account locked responsive to a fraud event, determining a safe authentication value for the fraud event, and unlocking the second user account responsive to the at least one first user account being a safe authentication account and the safe authentication value being over a safe authentication threshold value.

Example 17 is the computer-implemented method of Example 16, comprising unlocking the second user account responsive to receiving at least one identifier for the second user account from at least one first computing device associated with the at least one first user account.

Example 18 is the computer-implemented method of Example 17, comprising sending the at least one identifier to a second computing device associated with the second user account.

Example 19 is the computer-implemented method of Example 16, comprising designating a user account as the safe authentication account based on a safe authentication score.

Example 20 is the computer-implemented method of Example 16, that may further include unlocking the second user account responsive to receiving at least one identifier for the second user account from at least one first computing device associated with the at least one first user account, sending the at least one identifier to a second computing device associated with the second user account, and designating a user account as the safe authentication account based on a safe authentication score, the safe authentication score based on transactions associated with the user account, wherein the at least one first user account and the second user account comprising peer accounts, wherein the at least one identifier comprises at least one of a secret code or a profile element of the second user account, the profile element comprising at least one of an email address, a user name, a phone number, a device identifier, or an account identifier.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A computing device, comprising:
a storage device; and
logic, at least a portion of the logic implemented in circuitry coupled to the storage device, the logic to:
receive a request from at least one first user account, associated with a first user, to unlock a second user account, associated with a second user, the second user account locked responsive to a transaction, the first user different from the second user, determine an applicability of a safe authentication process by the at least one first user account based on a risk level associated with the transaction, and unlock the second user account responsive to the at least one first user account being a predesignated safe authentication account and the safe authentication process being applicable.

2. The computing device of claim 1, wherein the logic to determine the applicability of the safe authentication process is further based on whether the transaction can be unlocked via the safe authentication process.

3. The computing device of claim 1, wherein the logic to determine the applicability of a safe authentication process is further based on a peer management process score.

4. The computing device of claim 3, the logic to determine the peer management process score based on one of a risk factor, an account history, a transaction location, a transaction amount, or a transaction frequency.

5. The computing device of claim 1, the logic to unlock the second user account responsive to receiving at least one identifier for the second user account from at least one first computing device associated with the at least one first user account.

6. The computing device of claim 5, the logic to send the at least one identifier to a second computing device associated with the second user account.

7. The computing device of claim 5, the at least one identifier comprising a secret code.

8. The computing device of claim 5, the at least one identifier comprising a profile element of the second user account, the profile element comprising at least one of an email address, a user name, a phone number, a device identifier, or an account identifier.

9. The computing device of claim 1, the logic to designate a user account as the safe authentication account based on a safe authentication score.

10. The computing device of claim 1, the at least one first user account and the second user account comprising peer accounts.

11. A computer-implemented method, comprising, by a processor of a computing device:

receiving a request from at least one first user account, associated with a first user, to unlock a second user account, associated with a second user, the second user account locked responsive to a transaction, the first user different from the second user;

determining an applicability of a safe authentication process by the at least one first user account based on a risk level associated with the transaction; and unlocking the second user account responsive to the at least one first user account being a predesignated safe authentication account and the safe authentication process being applicable.

12. The computer-implemented method of claim 11, comprising determining the applicability of the safe authentication process based on whether the transaction can be unlocked via the safe authentication process.

13. The computer-implemented method of claim 11, comprising determining the applicability of a safe authentication process based on a peer management process score.

14. The computer-implemented method of claim 13, comprising determining the peer management process score based on one of a risk factor, an account history, a transaction location, a transaction amount, or a transaction frequency.

15. The computer-implemented method of claim 11, comprising unlocking the second user account responsive to receiving at least one identifier for the second user account from at least one first computing device associated with the at least one first user account.

16. The computer-implemented method of claim 15, comprising sending the at least one identifier to a second computing device associated with the second user account.

17. The computer-implemented method of claim 15, the at least one identifier comprising a secret code.

18. The computer-implemented method of claim 15, the at least one identifier comprising a profile element of the second user account, the profile element comprising at least one of an email address, a user name, a phone number, a device identifier, or an account identifier.

19. The computer-implemented method of claim 11, comprising designating a user account as the safe authentication account based on a safe authentication score.

20. The computer-implemented method of claim 11, the at least one first user account and the second user account comprising peer accounts.

* * * * *